Jan. 3, 1956  L. G. ARPIN  2,729,131
PRECISION TOOL ADJUSTMENT DEVICE
Filed No 25, 1952
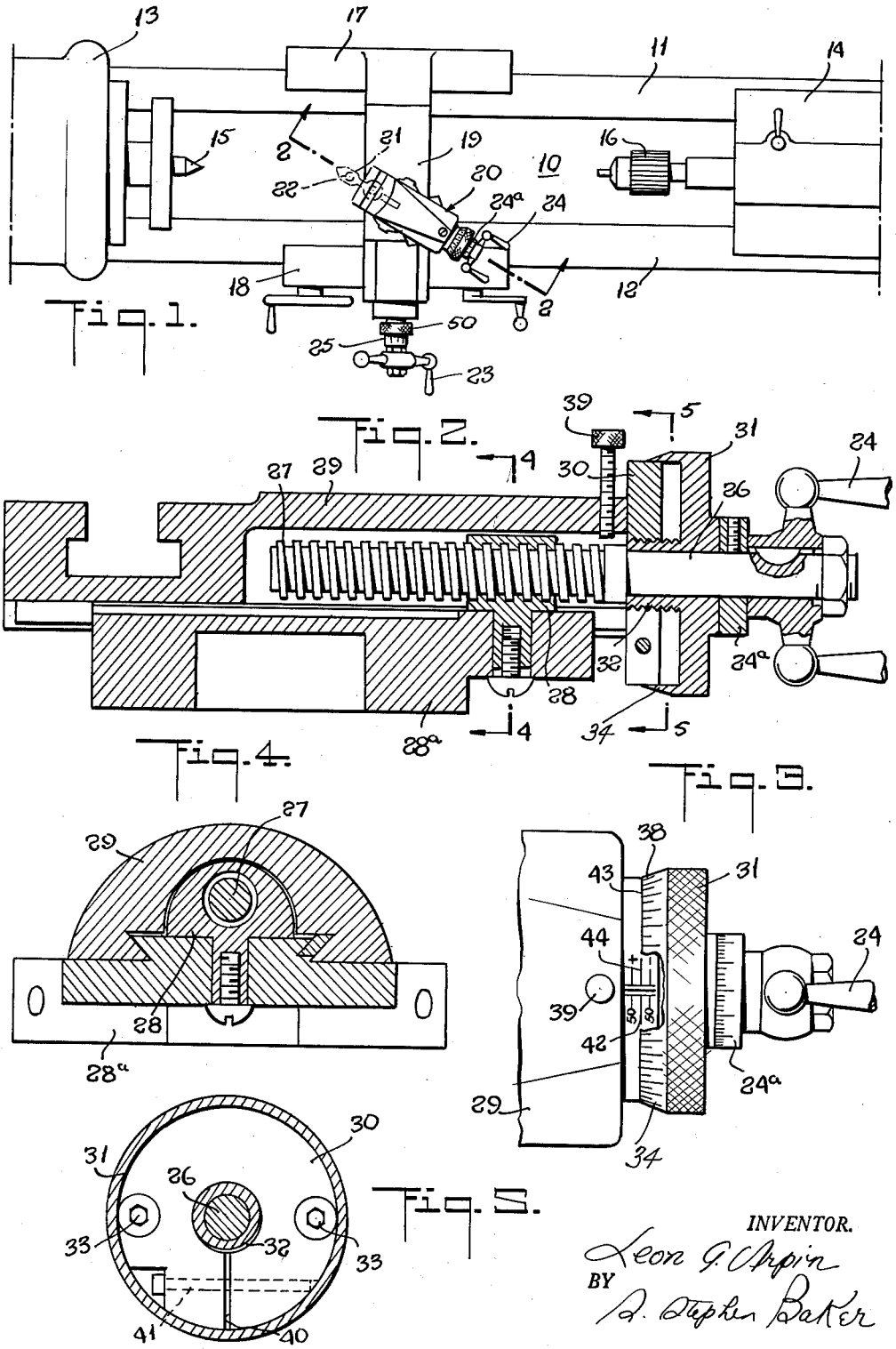
INVENTOR.
Leon G. Arpin
BY
A. Stephen Baker
ATTORNEY – # United States Patent Office 2,729,131
Patented Jan. 3, 1956

2,729,131
PRECISION TOOL ADJUSTMENT DEVICE

Leon G. Arpin, Montclair, N. J.

Application November 25, 1952, Serial No. 322,523

1 Claim. (Cl. 82—24)

This invention relates to a precision tool adjustment device on power machines such as lathes, milling machines and similar mechanisms. This application is a continuation in part of my prior application Serial No. 283,716, filed April 22, 1952.

In said prior application, as well as in application Serial No. 296,981, filed thereafter, I disclosed means for making positive, precise adjustments of a cutting tool where only close tolerances are permitted in the finished product and where precise dimensions were accordingly required. The invention was illustrated in connection with a lathe wherein the cutting tool or the like must be adjusted with precision in order to produce an accurate machining of the work.

The device of the instant invention is likewise illustrated as applied to a lathe and specifically, means are illustrated to produce precision movement of the tool holder apart from the normal actuating mechanism therefor. As is well understood, the tool holder is fixed in a compound which comprises a slidable head operating in a dove tail groove constituting the compound slideways. Movement of the slidable head is controlled by a lead screw of a given pitch. The lead screw is disposed within an internally threaded nut and rotation of the screw produces movement of the slidable compound head. The compound feed screw moves transversely, the internally threaded nut with which it co-acts being fixed.

In my prior applications I disclosed systems whereby the lead screw could be actuated either by its conventional ball and crank handle or independently thereof by a worm gear mechanism. The worm gear mechanism constituted the precision adjustment.

While my prior systems have functioned effectively in producing the desired result, I have devised what I now consider a superior system in that I have by-passed or eliminated movement of the lead screw completely while nevertheless achieving precision movement of the compound head.

The elimination of lead screw movement for producing adjustment has brought about unusually desirable results, the most important being the continued accuracy of the adjustment mechanism over long periods of time notwithstanding any wear to which the lead screw is subjected. Thus, even should the teeth of the lead screw or the threads of its co-acting nut develop considerable backlash, it will have no effect upon the precision adjustment of the disclosed mechanism. The mechanism is further of pronounced simplicity as regards production and installation and a minimum of changes are required in conventional lathe equipment.

The invention is realized by employing a specially constructed two piece collar device on the lead screw shaft and disposed forwardly of the compound head. This collar device is made adjustable in such a way that it operates directly on the compound head so as to slide it along the compound slideways independently of the lead screw os its co-acting nut, a result, it is believed, which has been considered virtually impossible.

The invention will be further understood from the following description and drawings in which:

Figure 1 is a top plan view, partly broken away, of a lathe showing the work holding and cutting means and provided with the device of the instant invention;

Figure 2 is an enlarged cross-sectional view taken substantially along the lines 2—2 of Figure 1;

Figure 3 is an enlarged, top plan view of the adjustable collar;

Figure 4 is a cross-sectional view as taken along the lines 4—4 of Figure 2; and Figure 5 is a cross-sectional view as taken along the lines 5—5 of Figure 2.

The invention is shown as applied to a lathe in which 10 is the bed, 11 and 12 the bedways, 13 the headstock and 14 the tailstock. Headstock 13 is illustrated in carrying the center 15, while tailstock 14 carries a chuck 16, the work being supported between the center 15 and the chuck 16.

Slidably arranged on the ways are the saddle members 17 and 18 which bear the cross-slide 19. Disposed on the cross-slide is the compound 20 which carries the tool holder 21 which in turn carries the cutting tool 22. The compound is actuated bodily by the slide 19 by operating the bolt and crank handle 23 while the compound head is actuated by operating the handle 24.

It will be recognized that when handle 24 is rotated, employing the conventional indicia wheel 24a as a reference means, the compound feed screw or lead screw is actuated and the compound head is moved accordingly. In the same way, when handle 23 is rotated, employing the conventional indicia wheel 25 as a reference means, the cross feed screw or lead screw is actuated and the compound is moved bodily.

The adjusting device of the instant invention is illustrated as being connected to the shaft 26 of compound lead screw 27. Lead screw 27 is employed in a conventional manner for making normal or rough adjustments. Thus, handle 24 is rotated, for this purpose, which in turn rotates lead screw 27. Since, in the compound head, the co-acting nut 28 is fixed in respect to the stationary base 28a, the lead screw 27 necessarily travels transversely of the nut 28 as it rotates. During such transverse movement, it carries the compound head 29 with it in conventional manner so as to produce the required transverse adjustment of the compound head.

Accordingly, to the present invention, I have devised means for actuating the compound head 29 independently of the actuation of the lead screw 27. In the form shown, this is accomplished by employing an adjustable collar device comprising the threaded collar 30 and the thimble 31 disposed on the shaft 26 of lead screw 27. Thimble 31 is freely rotatable on the screw shaft and is formed with an externally threaded hub 32 which is engaged by the internal threads of the central opening or bore of collar 30 although the complementary threads may be otherwise disposed as will be evident. Collar 30 is secured to the end face of compound head 29 by bolts 33 as illustrated in Figure 5. While collar 30 is disposed around the screw shaft it is free thereof and is not affected by rotation of the screw.

Thimble 31 is formed with a bevelled flange 34 which embraces collar 30. Flange 34 bears indicia so that it may be referred to as the indicia wheel of my precision adjustment mechanism. The conventional indicia wheel 24a may be employed in the usual manner for the normal or rough adjustments.

The device of the instant invention is operated as follows:

After having made the normal or rough adjustments by rotating the handle 24, the position of the tool holder may be ascertained as by a micrometer or similar measuring instrument. As an example, it may then be found that the adjustment of the tool holder is off .0005 inch. Ordinarily, slight inaccuracies such as this could be corrected by actuation of the lead screw only with very great difficulty, if at all. The reason, therefore, is that the thread of lead screw 27 is usually 10 pitch and the indicia wheel 24a bears 100 marks. Therefore, each mark represents .001 advancement or retraction of the lead screw which actually means a .002 change in diameter of the article being machined. It will be recognized therefore, that it is an extremely difficult task to accurately produce a .0005 change in diameter since it would be required to visually divide each mark of wheel 24a into a fraction.

In accordance with the present invention, the thimble 31, which is provided with a knurled outer surface, is manually rotated so as to advance or retract the collar 30 by the mating of its internal threads with the threads of hub 32. If the collar 30 is advanced inwardly within thimble 31, it draws the compound head correspondingly inwardly, such compound head sliding in its slideways independently and relative to the lead screw 27. In the same way, if the thimble 31 is rotated counterclockwise so as to separate it from the collar 30, the collar 30 effects the advancement of compound head 29. In effect, the collar 30 and thimble 31 represent an expansible or contractable collar device which is varied in its effective thickness and is further capable of precision adjustment in accordance with the pitch of the mating threads. As an example, the hub 32 bears threads of 40 pitch so that a complete turn of thimble 31 effects a movement of .025". Flange 34 bears 50 marks so that each mark advances the compound head .0005". Furthermore, the wheel 31 being approximately 2 inches in diameter, the indicia wheel 34 is conveniently provided with half marks 38 so that these half marks permit the accurate advance or retraction of the compound head .00025", a result which is virtually impossible of accomplishment in conventional mechanism.

It is desirable to insure against rotation of the lead screw during adjustment by the expansible collar disclosed. Accordingly, I provide a set screw 39 which may be tightened by hand against the lead screw 27 for preventing rotational movement thereof. On the other hand, when the compound head 29 is actuated by my mechanism, the end of screw 39 will slide along the shaft 27. It will be recognized that the screw 39 need not and should not be tightened down very securely since it is only intended to prevent accidental rotation of the lead screw 27. Set screw 39 may be disposed in the conventional oil hole found in the compound head, such oil hole being threaded in order to receive the threaded screw 39.

Means are also provided to insure against wear or backlash in the threads of collar 30 and hub 32. Such means are shown in Figure 5 where the collar 30 is disclosed as formed with a split 40 which is traversed by a bolt 41. If, after some use, some wear should develop between the threads, it is only necessary to tighten up on bolt 41 so as to reduce the extent of the split 40 and tighten the collar 30 around the hub 32.

It will be recognized that after normal or rough adjustment has been made by actuating handle 24, it may be necessary to retract the compound head through the improved mechanism. However, it may be found at this time that the expansible collar device is at the limit of its contraction. This would obviously prevent corresponding further retraction of the compound head. Accordingly, it is desirable to provide the periphery of collar 30 with indicia 42 so that the edge 43 of flange 34 may be disposed at an intermediate or zero position 44 prior to the normal or rough adjusting operation. In this way, ability to move the compound head either way is assured. Indicia 44 may be simply set forth in zero and plus 50, minus 50 designations, the numeral 50 indicating a movement of .050". Indicia 44, it will be noted is arranged perpendicularly relative to indicia of flange 34.

While I have described my invention as being applied to the compound head actuating mechanism, it is obvious that it may likewise be applied to the cross feed mechanism for actuating the compound bodily. For this purpose, the collar device is merely disposed forwardly of the indicia wheel 25 in place of the collar 50 in Figure 1.

What is claimed is:

In a lathe compound feed having a rotatable feed screw and shaft, and a compound which is adjusted by the rotation of said feed screw, means independent of the rotation of said feed screw for producing precision adjustment of said compound, said means comprising an indicia wheel freely rotatable on said feed screw shaft, an externally threaded hub on said wheel, the threads of said hub being of a higher pitch than the threads of the feed screw, a collar having a central bore and disposed around the feed screw shaft while being free thereof, said bore being threaded and mating with the wheel hub threads for retracting or attracting the collar, said collar being connected to the compound whereby said retraction or attraction of the collar produces a corresponding movement of the tool holder, and a hand operated screw on said compound, said screw being adapted to be tightened against said feed screw shaft for preventing rotation thereof during rotation of said wheel, a flange bearing indicia markings for indicating the extent of rotational action of said wheel, and additional indicia markings on said collar, said collar markings being perpendicularly arranged relative to the wheel flange markings for indicating the extent of attraction or retraction of said collar within said flange.

References Cited in the file of this patent

UNITED STATES PATENTS

| | | |
|---|---|---|
| 1,290,550 | Hardinge | Jan. 7, 1919 |
| 1,508,794 | Ingham | Sept. 16, 1924 |
| 2,619,863 | Bechler | Dec. 2, 1952 |
| 2,677,296 | Morgan | May 4, 1954 |

FOREIGN PATENTS

| | | |
|---|---|---|
| 127,581 | Germany | Jan. 24, 1902 |
| 486,012 | France | Mar. 5, 1918 |